No. 612,114. Patented Oct. 11, 1898.
H. G. LOCKE.
BOOT OR SHOE TREEING MACHINE.
(Application filed Dec. 1, 1892.)
(No Model.) 3 Sheets—Sheet 2.
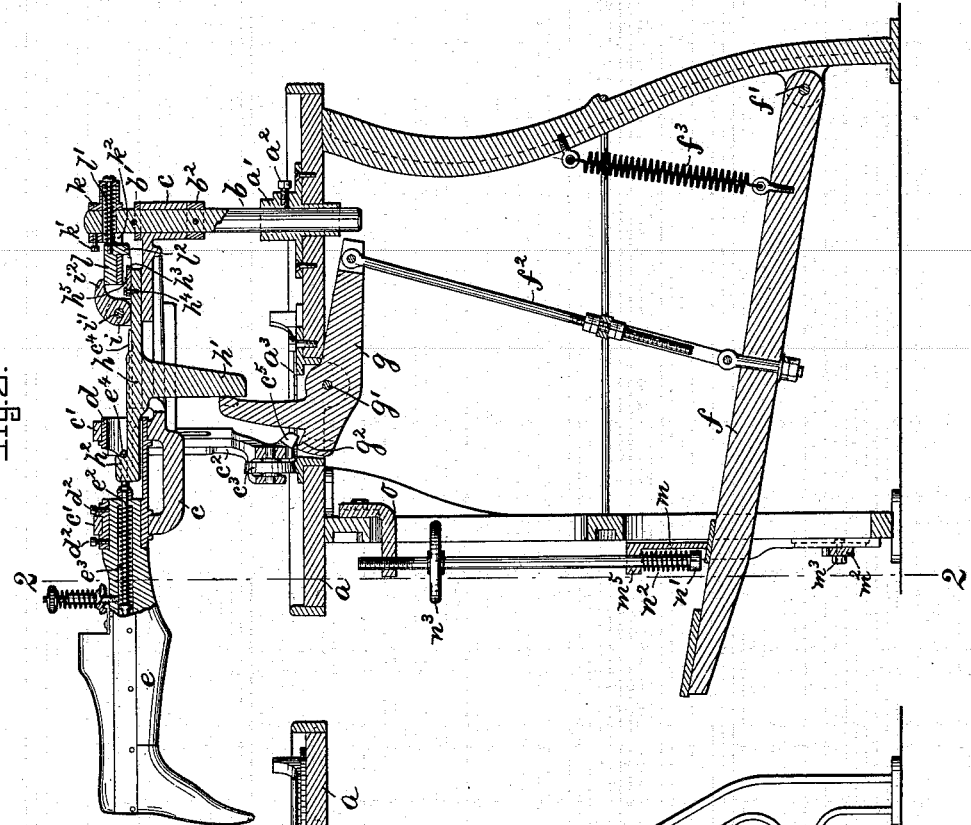
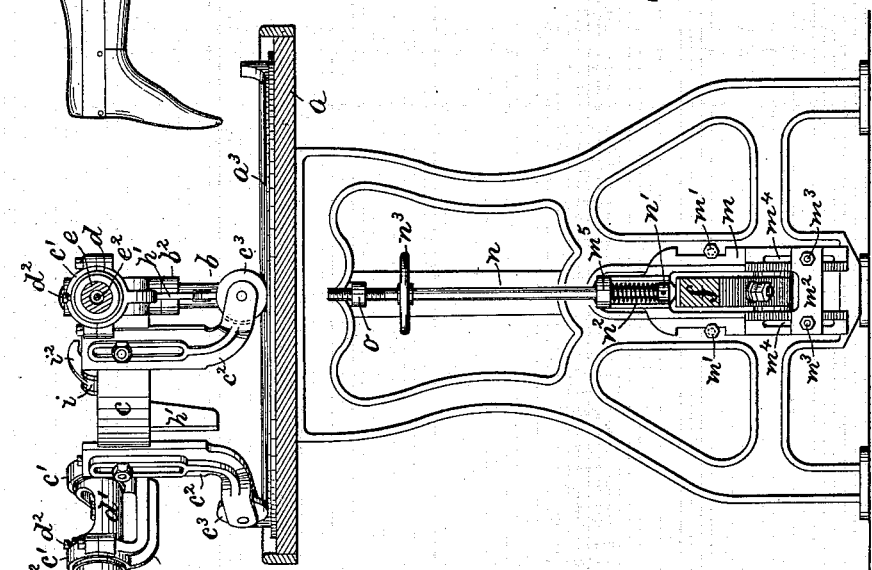
Witnesses
D. E. Kempster
Anna M. Dolloff
Inventor
Howard G. Locke
by Henry Chadbourne
his Atty.

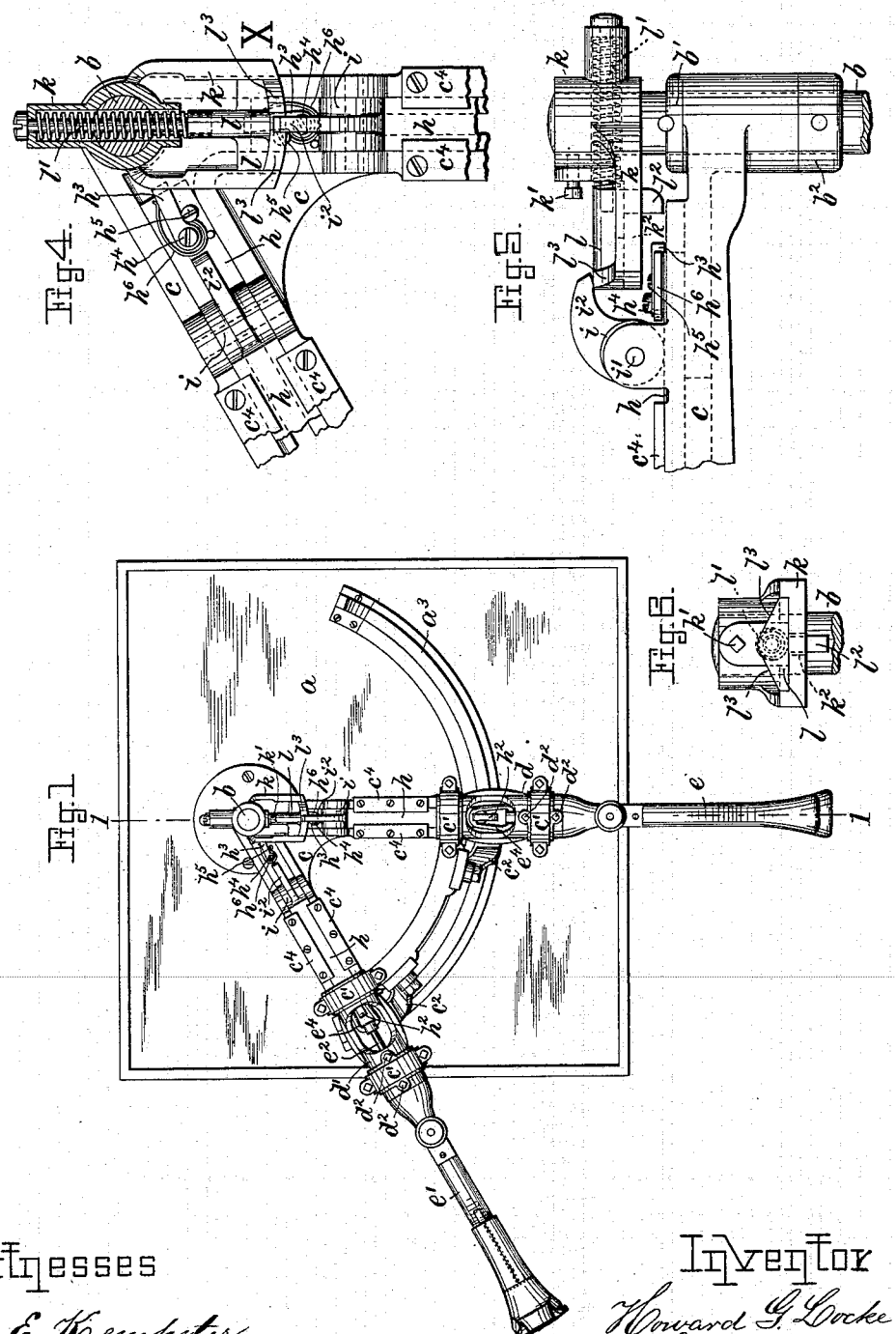

No. 612,114.　　　　　　　　　　　　Patented Oct. 11, 1898.
H. G. LOCKE.
BOOT OR SHOE TREEING MACHINE.
(Application filed Dec. 1, 1892.)
(No Model.)　　　　　　　　　　　　3 Sheets—Sheet 3.
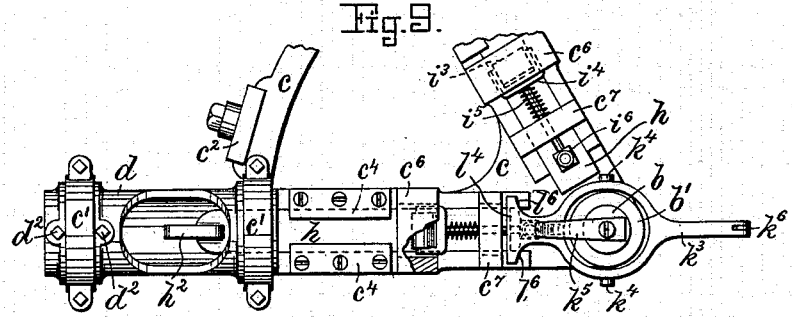
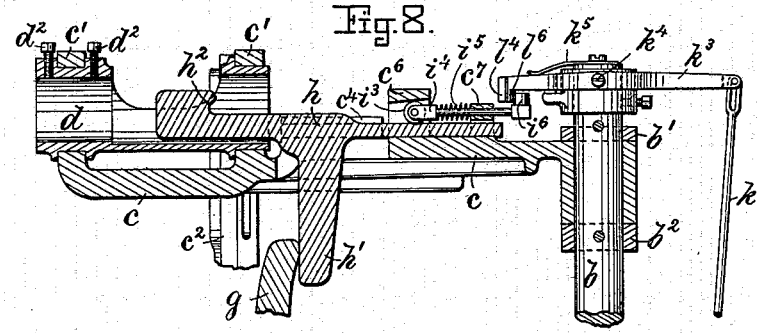
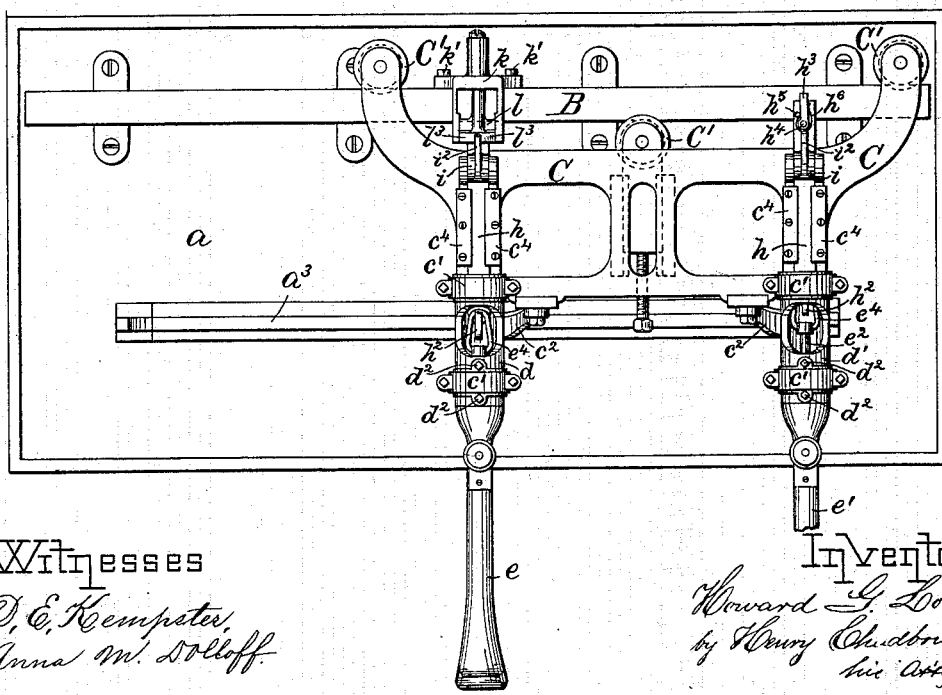
Witnesses
D. E. Kempster
Anna M. Dolloff
Inventor
Howard G. Locke
by Henry Chadbourn
his Atty.

UNITED STATES PATENT OFFICE.

HOWARD G. LOCKE, OF WEYMOUTH, MASSACHUSETTS, ASSIGNOR TO OLIVER A. MILLER, OF BROCKTON, MASSACHUSETTS.

BOOT OR SHOE TREEING MACHINE.

SPECIFICATION forming part of Letters Patent No. 612,114, dated October 11, 1898.

Application filed December 1, 1892. Serial No. 453,749. (No model.)

*To all whom it may concern:*

Be it known that I, HOWARD G. LOCKE, a citizen of the United States, and a resident of South Weymouth, in the county of Norfolk and State of Massachusetts, have invented certain new and useful Improvements in Boot or Shoe Treeing Machines, of which the following, taken in connection with the accompanying drawings, is a specification.

This invention relates to improvements in boot and shoe treeing machines of that class in which a plurality of trees expanded and contracted by the manipulation of a rod thereon are mounted on a pivotal or sliding frame with mechanism so arranged as to expand each tree in its turn or to allow it to contract when moved to a given position on the machine.

It consists in novel mechanism for automatically and independently locking each of the trees against contraction during the time that they are being expanded and keeping them locked until they are released by a suitable releasing mechanism, in mechanism for automatically unlocking or releasing the trees and allowing them to contract at the proper time, and in minor details of construction, as will be fully set forth hereinafter.

My invention is applicable to machines having any number of trees mounted thereon either radially and adapted to be rotated or oscillated to and from a central position or arranged side by side on a sliding frame and adapted to be reciprocated to and from the central position.

The invention is carried out as follows, reference being had to the accompanying drawings, forming a part of this specification, whereon—

Figure 1 represents a plan view of my improved machine arranged with an oscillating frame having two radiating trees mounted thereon. Fig. 2 represents a central vertical longitudinal section on the line 1 1, shown in Fig. 1, having the tree and some of the internal parts shown partly in side elevation. Fig. 3 represents a vertical cross-section on the line 2 2, shown in Fig. 2. Fig. 4 represents a detail sectional plan view showing the manner of pivoting the oscillating frame to the machine, also the means employed for automatically locking and unlocking the trees when expanded. Fig. 5 represents a side elevation of the same as seen from X in Fig. 4. Fig. 6 represents a detail front elevation of the cam which forms a trip to unlock the expanded trees at the proper time. Fig. 7 represents a plan view of my invention as applied to a machine having a sliding frame adapted to reciprocate to and from a central position. Fig. 8 represents a central longitudinal section of a modified form of the locking and unlocking mechanism for the expansible trees. Fig. 9 represents a detailed plan view of the same.

Similar letters refer to similar parts wherever they occur on the different parts of the drawings.

Referring to Figs. 1 to 6, inclusive, the bench or table $a$, made in any desired form, is provided with the bearing $a'$, in which the vertical shaft $b$ is adjustable up and down and held in its adjusted position by means of the set-screw $a^2$, which impinges said shaft, or it may be held by any other well-known and equivalent means.

Between collars $b'$ and $b^2$ on the shaft $b$ is loosely mounted the frame $c$ in such a manner as to allow it to be turned on said shaft as a center, so as to bring each tree mounted on the frame in its turn to a position in front of the operator, as set forth hereinafter. Thus the shaft $b$ forms a supporting-standard for the frame. Within bearings $c'$ $c'$ on the outer end of the frame $c$ are loosely journaled the barrels $d$ $d'$, and within these barrels the radiating trees $e$ $e'$ are firmly held by the set-screws $d^2$ $d^2$. Thus it will be seen that although the trees are firmly held in the barrels they may be turned upon their longitudinal axes by turning said barrels in their bearings on the frame $c$. This construction furnishes a longer bearing for the tree to turn upon, and therefore keeps it more steady than if the tree itself was free to turn in bearings on the frame. The trees preferably used on this my improved machine are those in which the tree is expanded by exerting a pulling strain upon the rod $e^2$, projecting from the tree, which tends to withdraw the rod therefrom against the influence of the spring $e^3$ within the tree and through well-known mechanism (not shown on the drawings) to expand the tree. The tree is contracted by allowing said spring to return said rod to its normal position. I do not wish to confine myself to the use on my machine of any particular kind of expansible tree, as there are many trees now in common use which might be used to equal advantage with those shown on the drawings.

The frame $c$ is free to turn upon the shaft $b$ as a pivot horizontally in either direction from a central position in front of the operator, and it is supported by means of the brackets $c^2$ $c^2$, adjustably attached to the frame, which brackets are provided with antifrictional rolls $c^3$ $c^3$, adapted to run upon the track $a^3$ on the table $a$, as shown. These brackets are preferably made offset, so as to bring the bearing-surface of the rolls $c^3$ directly under the longitudinal axis of the trees, or nearly so, thus preventing any tendency of the frame to tilt when a downward pressure is exerted upon a boot or shoe mounted on a tree in treeing and finishing the same.

The brackets $c^2$ $c^2$ and the frame $c$ are made adjustable, so as to vary the height of the trees carried by the frame to suit the convenience of the operator using the machine.

A treadle $f$ is pivoted at $f'$ to the frame of the table $a$, and is connected by the connecting-rod $f^2$ to the bell-crank lever $g$, fulcrumed at $g'$ to the table or to a bracket on the same. The free end of the lever $g$ rests against the downward projection $h'$ on the slide $h$, which slide is movable within guides $c^4$ $c^4$ on the frame $c$ toward and from the shaft $b$. The slide $h$ is provided in its forward end with a hook $h^2$, upon which the ring $e^4$ on the rod $e^2$ is hooked, as shown. Thus it will be seen that if the treadle $f$ is depressed it will turn the bell-crank lever on its fulcrum, which by its contact with the projection on the slide will force the slide toward the shaft $b$, and exerting a pulling strain on the rod $e^2$ will expand the tree within the boot or shoe which may be placed thereon.

In order to lock the slide, and with it the tree in its expanded condition, I provide the frame with an automatic locking device, preferably in the form of the eccentric or cam $i$, which is fulcrumed at $i''$ to the frame, or to ears projecting therefrom, in such a manner that it will allow the slide to be freely moved toward the shaft $b$, but will be turned on its fulcrum by the weight of the tail $i^2$ of the cam, or a suitable spring acting thereon, so as to wedge itself against the upper surface of the slide with sufficient force to hold the slide against the pressure of the spring $e^3$ in the tree and the strain on the boot or shoe mounted thereon.

In order to lock the frame in its proper position while the tree is being expanded and while the boot or shoe is being rubbed and finished by the operator, I provide each of the brackets $c^2$ $c^2$ with a recess $c^5$, (shown in Fig. 2,) into which the tapering projection $g^2$ on the bell-crank lever $g$ is forced by the depression of the treadle $f$ and consequent turning of the bell-crank lever on its fulcrum when expanding the trees. Thus it will be seen that it is impossible to turn the frame $c$ upon the shaft $b$ after the treadle commences to be depressed against the influence of the spring $f^3$, attached to the treadle and to the standard of the table and until the treadle is allowed to be returned to its normal or upper position by means of said spring.

On account of variations in the elasticity of leather, and consequently the variations in the amount of pressure necessary to take up the slack in the leather to properly tree boots and shoes made therefrom, I provide the treadle $f$ with an adjustable yielding stop which will furnish a stop for the treadle when depressed with an ordinary pressure, but can be made to yield and allow the treadle to be further depressed, if so desired, by an increased pressure exerted on the treadle in order to increase the expansion of the tree. This adjustable yielding stop is preferably made as follows, but I do not wish to confine myself to the exact construction herein described, as the same may be varied at will: To the standard of the table is attached the vertically-sliding forked yoke $m$, which is guided by the pins $m'$ $m'$ and extend downward on either side of the treadle. It is provided at its lower end with a bar $m^2$, adjustably secured to said yoke by means of the bolts $m^3$ $m^3$, which are movable up and down within slides $m^4$ $m^4$ in the yoke $m$ to adjust the position of the bar $m^2$. The bar $m^2$ forms a stop against which the treadle comes into contact when pressed downward in treeing the boot or shoe. A rod $n$ plays loosely through a perforation in an ear $m^5$ on the upper part of the sliding yoke $m$, and has a spiral spring $n^2$ surrounding it between the under surface of said ear and a collar $n'$ upon the rod.

The rod $n$ is screw-threaded in its upper end and is screwed through a screw-threaded perforation in a bracket $o$, attached to or made in one piece with the standard of the table of the machine. This rod is provided with a hand-wheel $n^3$, by which it is adjusted up and down within the bracket $o$ to adjust the position of the yoke $m$ and attached stop $m^2$ upon the standard to allow the treadle to be depressed more or less, as required, to sufficiently expand the tree.

When the treadle has been depressed sufficiently to bring it into contact with the stop $m^2$, it will be seen that a further depression of said treadle will cause the yoke $m$ to move downward on the guide-bolt $m'$ $m'$ and rod $n$ against the influence of the spring $n^2$ on said rod compressing said spring. This increase over the usual movement of the treadle tends to further expand the tree and to remove any slack which may remain in the leather of the boot or shoe mounted on said tree.

With the frame in the position shown in Fig. 1 and after a boot or shoe has been properly treed and finished on the tree $e$, which is locked in the central position in front of the operator, the treadle is allowed to return to its upper position and the frame with the tree $e$ still expanded and locked, is turned on the shaft $b$ to the right, which causes the tree $e'$ to be brought to the central position automatically unlocked and allowed to contract, as described hereinafter.

The frame $c$ is provided with an independent slide $h$ and locking-cam $i$ for each tree mounted thereon.

By providing the machine with an independent locking device for each tree mounted thereon I am able to expand each tree more or less, as desired, to compensate for the variations in the elasticity of the leather of different boots or shoes treed on the same without first adjusting the tree.

Upon the shaft $b$ and above the frame $c$ is mounted the bracket $k$, which is held rigidly on said shaft by means of the set-screw $k'$ and projects forward toward the position on the machine at which the boots or shoes are placed upon the trees and in a line parallel to the movements of the slide $h$ when expanding the tree.

Within guides upon the bracket $k$ is placed the block $l$, which is movable forward and backward on said bracket, but is normally held in its forward position by means of the spring $l'$, as shown. The block $l$ is provided with a downward projection $l^2$, which passes through a slot $k^2$ in the bracket $k$ and limits the forward movement of the block by coming in contact with the forward part of said slot.

The block $l$ is tapered on its forward edge, as shown in Fig. 6, being highest in the center and tapering toward its sides, forming the inclined ways $l^3$ $l^3$, upon which the tail $i^2$ of the locking-cam $i$ moves when the frame $c$ is turned upon its fulcrum to bring a tree to the central position in front of the operator. This movement of the tail of the cam causes the cam to turn on its fulcrum, releasing the slide $h$, which has been held thereby, and thus allowing the spring $e^3$ within the tree held by said cam to contract the tree, as above set forth.

In order to move the block backward, so as not to come into contact with the tail of the cam when the slide is forced backward by the treadle $f$ in expanding the tree and thus to allow the tail of the cam to lock said slide as above described, I provide the slide with a pawl $h^3$, fulcrumed at $h^4$ to the slide, which pawl is normally held with a yielding pressure against the pin $h^5$ on the slide by means of the spring $h^6$. This pawl is of sufficient length to extend backward far enough to come into contact with the projection $l^2$ on the block $l$ and to force said block backward against the influence of the spring $l'$, so as to allow the weight of the tail of the cam to lock the slide and with it the expanded tree attached thereto.

After a boot or shoe has been treed upon one of the trees $e$ $e'$, the tree swung to one side to allow the boot or shoe to dry and is being returned to its central position in front of the operator to be removed from the tree, the pawl $h^3$ will come into contact with the side of the projection $l^2$, which, with the block $l$, has been moved to its forward position by the influence of the spring $l'$, and said pawl will yield sufficiently against the influence of the spring $h^6$ to allow the tree to assume its central position and the tail of the cam to come into contact with one of the inclined ways $l^3$, which will operate the cam and, unlocking the slide $h$, will allow the spring $e^3$ to contract the tree within the boot or shoe mounted thereon. Thus it will be seen that the tree will be automatically locked during any part of the expansion of the same on account of the automatic locking of the slide $h$ by the cam $i$ and that there will consequently be no loss of the strain obtained on the boot or shoe being treed, as the cam $i$ will lock and hold the slide at the nearest position to the shaft $b$ reached by the slide in consequence of the depression of the treadle $f$. This causes the boot or shoe to be more perfectly treed than when the amount of expansion of the trees depends upon the engagement of a hook or other projection with the teeth on a rack, which has heretofore been the mechanism employed in treeing-machines.

The automatic locking and unlocking of the trees as herein described dispenses with the need of a second treadle to accomplish this result and therefore relieves the operator of one and in some cases two operations, as required in treeing-machines now in common use.

I do not wish to confine myself to the exact mechanism shown for operating the slide $h$ to expand the tree, as any suitable and well-known mechanism may be used in lieu thereof within the scope of my invention.

In the machine as represented by a plan view in Fig. 7 the frame $c$ and its attachments are mounted on the standard B in such a manner that the frame and the trees attached thereto are capable of reciprocation on the standard to and from a central position, so as to be able to tree a boot or shoe while the tree is in its central position and then to move it to one side to dry, as described hereinbefore in relation to the machines constructed as shown in Figs. 1 to 6, inclusive. In Fig. 7 I have simply shown the frame and its supporting-standard without the attached mechanism for operating the trees and frame, as those parts are fully shown in the preceding figures and their representation is deemed unnecessary in connection with this figure. In constructing machines having a sliding reciprocating frame it is preferable to provide the frame with the rolls C' C' C', so as to make it easy to operate; but they are not essential to the working of the machine.

The modification shown in Figs. 8 and 9 is constructed as follows: The slide $h$ passes through a perforation in an ear $c^6$ on the frame $c$, said perforation being made sufficiently large and tapering so as to form a tapering space between the upper surface of the slide and the upper part of the perforation in the ear $c^6$. A roller $i^3$, having a diameter equal to the distance between the upper surface of the slide and the upper surface of the perforation in the ear $c^6$, is placed within the tapering space formed between said surfaces and is journaled to the forked bar $i^4$. This bar is guided in a perforation through a second ear $c^7$ on the frame and is provided with a spring $i^5$, which exerts a pressure on the roller $i^3$, tending to force the roller into the tapering space between the upper surface of the slide and the surface of the perforation in the ear $c^6$, and so wedge it firmly therein. The wedging of the roller as above described locks the slide against movement in one direction, but allows it to be freely moved in the other direction. The tapering space is so formed that the slide will be held by the roller and lock the tree in its expanded condition at any part of the expansion thereof. In order to release said slide and to allow the spring in the trees to contract the tree, I provide a lever $k^3$, fulcrumed at $k^4$ to a collar $b'$ on the vertical shaft $b$ or to the standard of the machine. This lever is provided on its forward end with the block $l^4$, which block is provided with the inclined surfaces $l^6$ $l^6$, as shown in Fig. 9, against which a friction-roller $i^6$ on the forked rod $i^4$ comes into contact when the tree is moved with the frame $c$ from its side position to its central position. The action of the inclines on the friction-roll tends to withdraw the roller $i^3$ from the tapering space in the ear $c^6$, and releasing the slide allows the spring within the tree to contract the tree. The forward end of the lever $k^3$ is preferably normally held by means of the spring $k^5$ in position to operate on the roll $i^6$ and release the slide, and said lever is also connected by means of the rod $k^6$ to the treadle $f$, so that when the treadle is depressed to expand the tree the block $l^4$ will be raised sufficiently to allow the tree to be thoroughly expanded without having the roll come into contact with the block $l^4$ on the lever $k^3$. If after the tree has been expanded the treadle is allowed to assume its normal position, the block $l^4$ will be forced downward by the spring $k^5$, but will rest upon the top of the roller $i^6$ without releasing the tree; but the expanded tree and the frame to which it is attached may be moved to one side, as the block $l^4$ will rest against and slide upon the top of the roll $i^6$.

Having thus fully described the nature, construction, and operation of my improved machine, I wish to secure by Letters Patent and claim—

1. In a boot and shoe treeing machine, the combination with a standard or support, a movable frame mounted thereon, a plurality of expansible trees mounted on said frame, and a movable slide attached to each of said expansible trees, the movements of said slides causing the expansion or contraction of the tree to which it is attached, substantially as described; of a plurality of cam-shaped automatically-operated locking-pawls mounted on the movable frame, one for each slide, to automatically engage their respective slide to lock the attached tree in its expanded position, for the purpose set forth.

2. In a boot and shoe treeing machine, the combination with a frame, an expansible tree mounted thereon and a movable slide attached to the expansible tree, the movements of said slide causing the expanding or contracting of the tree, substantially as described, of a cam-shaped locking device and automatically-operated mechanism whereby said locking device is caused to engage said slide and to lock the tree in any part of its expanded position without loss in the expansion of the tree for the purpose set forth.

3. In a boot and shoe treeing machine, a standard or support, a frame mounted thereon movable to and from a central position, a plurality of expansible trees mounted on the frame, a plurality of independent separate and automatically-operated locking devices one for each expansible tree substantially as described, on the movable frame, one for each tree thereon, mechanisms substantially as described between the locking devices and trees whereby the trees are locked in their expanded positions by the locking devices, combined with a tripping device mounted on the supporting-frame to engage the locking devices to automatically unlock the trees when they are brought to the central position on the machine, for the purpose set forth.

4. In a boot and shoe treeing machine, a standard or support, a frame mounted thereon movable to and from a central position, a plurality of expansible trees mounted on the frame, a plurality of automatically-operated locking devices substantially as described on the frame, mechanisms substantially as described between the locking devices and trees whereby the trees are locked in their expanded positions by the locking devices, combined with a tripping device to engage the locking devices and automatically unlock the trees when they are brought to the central position on the machine, and a pawl to engage the tripping device when the trees are expanded so as to move the tripping device from contact with the locking device and allow the locking device to lock the trees for the purpose set forth.

5. In a boot and shoe treeing machine, a standard or support, a movable frame mounted thereon, movable to and from a central position, a plurality of expansible trees mounted on the movable frame a tree-expanding mechanism a plurality of independent separate and automatically-operated locking devices one for each tree to lock the trees when expanded, brackets attached to the frame and having antifrictional rollers, a track for the rollers, and stops to limit the movements of the frame in either direction, for the purpose set forth.

6. In a boot and shoe treeing machine, a standard or support, a movable frame mounted thereon, a plurality of expansible trees carried by the movable frame, mechanism to expand the trees, bearing-brackets attached to the frame and recesses in the bearing-brackets, combined with a treadle, a bell-crank lever, connecting mechanism between the treadle and bell-crank lever to operate the mechanism to expand the trees and a tooth or projection on the bell-crank lever to engage the recesses on the bearing-brackets to lock the movable frame while the trees are being expanded, for the purpose set forth.

7. In a boot and shoe treeing machine, a movable frame, a plurality of expansible trees movable with the frame to and from a central position mounted thereon, slides the manipulation of which expand the trees or allow them to contract, locking devices substantially as described to engage the slides to lock the trees when expanded and a pawl on each of the slides combined with an inclined block to engage the locking devices when brought to the central position to unlock the trees, a projection on the block to come into contact with the pawls on the slides when the trees are being expanded to remove the block from engagement with the pawls on the slides and a spring to return the block to its normal position when the trees are moved to one side from their central position and the pawls are moved from contact with the projection on the block for the purpose set forth and described.

8. In a boot and shoe treeing machine, a plurality of expansible trees mounted upon a movable frame, adapted to move to and from a central position, slides attached to the trees the movements of which expand or contract the trees, locking-cams to engage and lock the slides and a spring-pressed sliding block, said block having inclines to engage the locking-cam to unlock the slides when the trees attached thereto are moved to their central position and having also a downward projection as described, combined with pivoted pawls on the slides to engage said downward projection and move the sliding block to allow the slides to be locked by their locking-cams when their attached trees are expanded at the central position but to be turned on their pivots when the trees are moved to their central position by engagement with said downward projection so as to allow the slides to be unlocked by said block, substantially as set forth.

In testimony whereof I have signed my name to this specification, in the presence of two subscribing witnesses, on this 13th day of October, A. D. 1892.

HOWARD G. LOCKE.

Witnesses:
HENRY CHADBOURN,
CHARLES W. JONES.